(12) United States Patent
Taradalsky et al.

(10) Patent No.: US 7,712,631 B2
(45) Date of Patent: May 11, 2010

(54) METHOD FOR LIQUID DISPENSING USING A DISPENSE HEAD

(75) Inventors: Morris Taradalsky, San Jose, CA (US); Ross Rittiman, San Jose, CA (US); Edward A. Vetter, Santa Clara, CA (US); Benjamin M. Gallant, Berkeley, CA (US)

(73) Assignee: Napa Technology, Santa Clara, CA (US)

( * ) Notice: Subject to any disclaimer, the term of this patent is extended or adjusted under 35 U.S.C. 154(b) by 0 days.

(21) Appl. No.: 12/357,970

(22) Filed: Jan. 22, 2009

(65) Prior Publication Data

US 2009/0218365 A1    Sep. 3, 2009

Related U.S. Application Data

(63) Continuation of application No. 11/703,282, filed on Feb. 6, 2007.

(51) Int. Cl.
*B67D 1/04* (2006.01)

(52) U.S. Cl. ............... 222/1; 222/2; 222/53; 222/146.6; 222/148; 222/399; 222/400.7

(58) Field of Classification Search .................... 222/53, 222/399, 1, 2, 148, 146.6, 400.7
See application file for complete search history.

(56) References Cited

U.S. PATENT DOCUMENTS

| | | | |
|---|---|---|---|
| 3,112,844 A * | 12/1963 | Keller et al. ................. | 222/61 |
| 3,428,218 A * | 2/1969 | Coja ............................ | 222/23 |
| 3,777,937 A * | 12/1973 | Buck ........................... | 222/399 |
| 4,583,664 A * | 4/1986 | Bayat .......................... | 222/61 |
| 4,702,396 A * | 10/1987 | Gwiazda ..................... | 222/399 |
| 4,706,847 A * | 11/1987 | Sankey et al. ............... | 222/399 |
| 5,133,480 A | 7/1992 | Matsumoto et al. | |
| 5,152,437 A * | 10/1992 | Klein et al. ............... | 222/400.7 |
| 5,667,110 A * | 9/1997 | McCann et al. .......... | 222/386.5 |
| 6,216,913 B1 * | 4/2001 | Bilskie et al. ................. | 222/67 |
| 6,607,105 B2 * | 8/2003 | Phelps et al. ............. | 222/400.8 |
| 6,932,122 B2 | 8/2005 | Chantalat | |
| 7,172,096 B2 | 2/2007 | O'Dougherty | |
| 2005/0184084 A1 | 8/2005 | Wells | |
| 2007/0181602 A1 | 8/2007 | Taradalsky | |

FOREIGN PATENT DOCUMENTS

WO    WO03084860 A1    10/2003
WO    WO2005113417 A1    12/2005

* cited by examiner

*Primary Examiner*—Kenneth Bomberg
(74) *Attorney, Agent, or Firm*—Schneck & Schneck; David M. Schneck

(57) ABSTRACT

A liquid dispensing device including a dispense head configured to be placed and secured onto a bottle of liquid in a manner which enables the liquid to be dispensed. The dispense head includes a stopper having gas inlets and a liquid intake tube. A gas intake and a dispense spout are also mounted on the dispense head. A valve assembly allows pressurized gas to be introduced into the dispense head and into the bottle of liquid such that selective channeling of gas or liquid can be controlled to flow through the dispense spout thus enabling either liquid to pour through the spout or gas to clear the spout. A system utilizing this dispense head and a method of dispensing liquid using this head are possible with this device.

9 Claims, 18 Drawing Sheets

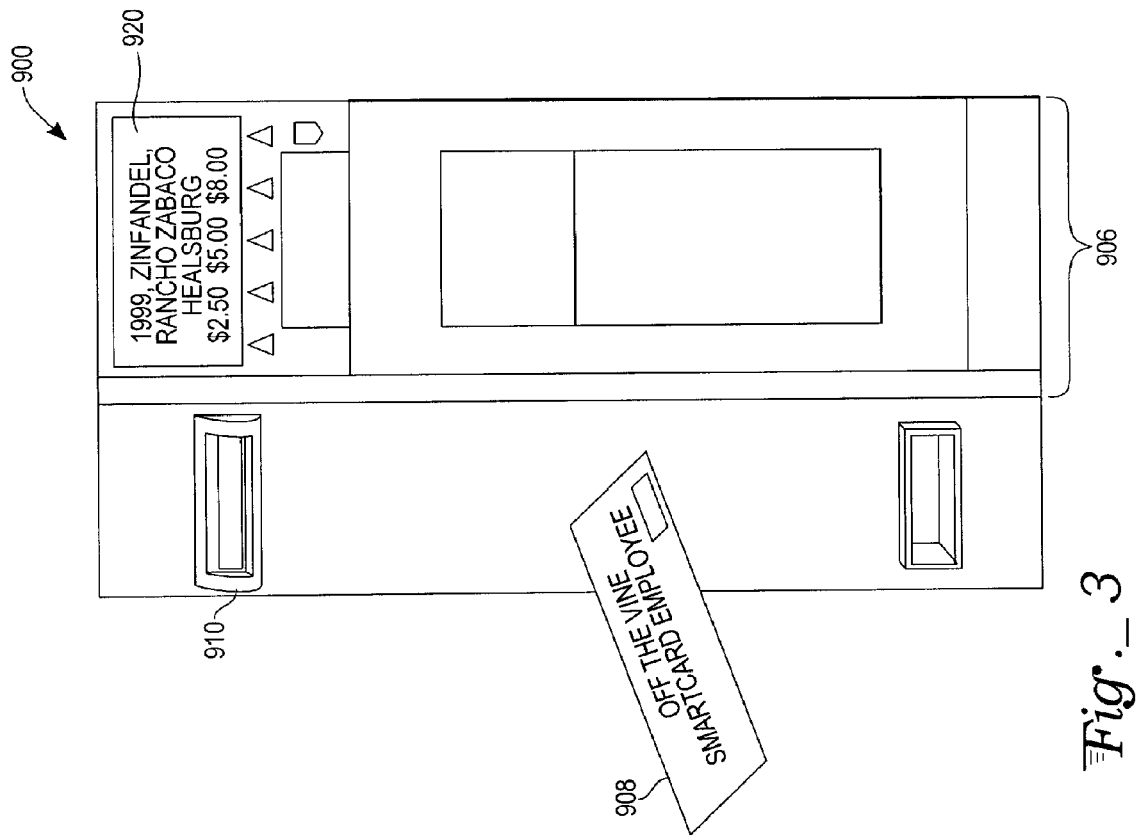
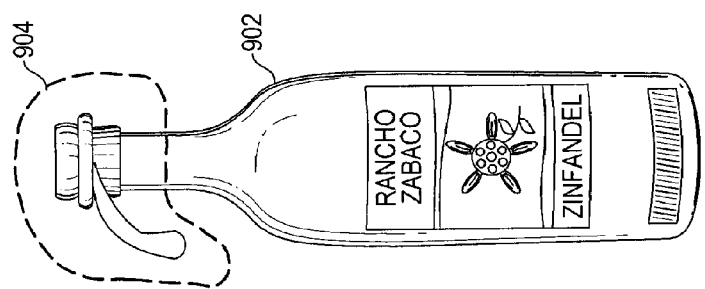
Fig._3

Fig. _ 11

METHOD FOR LIQUID DISPENSING USING A DISPENSE HEAD

CROSS-REFERENCE TO RELATED APPLICATION

This application is a continuation of U.S. patent application Ser. No. 11/703,282 filed Feb. 6, 2007.

TECHNICAL FIELD

The present invention relates to a method and apparatus for liquid dispensing.

BACKGROUND

Dispensing of liquids for human consumption requires some protection from liquid contamination. This is especially important for wine and other beverages in which subtle tastes are to be noted.

In addition, dispensing liquids, such as fine wines, requires some care in retail establishments to make sure that the pour is accurate, and does not shortchange either the customer or the restaurant, bar, or other establishment.

It is an object to provide devices and methods that address these and other concerns.

SUMMARY

The different embodiments of the invention include a method of dispensing liquid in which a dispense head is placed in the neck of a bottle. The dispense head has a front facing dispense spout and a rear facing gas intake. The dispense head is then moved into contact with a dispense machine, such that the intake on the dispense head is in fluid communication with a gas line on the dispensing machine and the bottle is held upright. The machine then receives information on an amount of liquid to be dispensed. A selected amount of inert gas is injected into the bottle, displacing a specified amount of liquid through the pour spout.

This method may include a number of additional features. These include electrically sensing when the dispense head is in contact with the dispense machine. Additionally the method could include clearing liquid from the dispense spout using a puff of the inert gas. The dispense head allows "pre-staging" of bottles, by attaching a dispense head, purging air within the bottle and replacing the air with inert gas, and storing the bottle until it is needed for dispensing. The control of the flow of gas and liquid may be through a rotary valve on the dispense head. Bottles may be removed by configuring the dispense head such that air cannot enter either through the dispense spout or through the gas inlet. The bottles dispensed by the machine may be held in a temperature-controlled enclosure. The method could include selection by the user of a pour volume at a displayed price, and receipt of a payment amount prior to dispensing liquid.

An embodiment could also be characterized as the dispense head, which includes a stopper having a plurality of stopper inlets, a liquid intake tube mounted on the stopper, a dispense spout, and a valve assembly attached to the stopper. These elements are in selectable fluid communication such that gas may flow through the stopper inlets and displace a volume of liquid in the bottle. The liquid will then flow through the intake tube and to the dispense spout. In an alternative valve assembly configuration, the gas can flow from the gas intake, through one of the plurality of stopper inlets and out the other stopper inlet to the dispense spout. This allows a "puff" of gas to clear the dispense spout after a pour. It also allows a bottle to be "primed" by replacing the head of air over the liquid with a non-reactive gas that may, for example, prevent oxidation of wine.

In different embodiments, additional features may be included. This may include at least two contacts on the dispense head allowing determination of when the head is positioned such that it is properly seated. The valve assembly may be configured to be rotated, and may include a rotation tab allowing automated rotation. The dispense head valve assembly may also allow sealing of the pathway to the dispense head and from the gas intake, allowing the bottle to be effectively sealed, pressurized, and preserved with inert gas.

In another embodiment, an apparatus for liquid dispensing includes a bottle holding location, a plurality of gas supply ports in the bottle holding location, a bay configured to hold a dispensing head, a motor above the bottle holding location, and a controller that directs operation of the motor and the gas supply. The motor engages the valve assembly allowing selection of dispensing of the liquid by displacement of a controlled amount of gas, purging using gas flow, or sealing of the bottle.

This apparatus may in various embodiments also include a card reader, a bar code reader, a display, a temperature regulation unit, and a latching cover.

BRIEF DESCRIPTION OF THE DRAWINGS

FIG. 3 is a front view of a wine bottle having a dispensing head secured over the neck of the bottle and a front view of a bottle holding stall of a liquid dispensing device.

DETAILED DESCRIPTION

The present device is used to dispense liquid held in a container. This liquid may be wine, but also could be other beverages.

Figure 1:
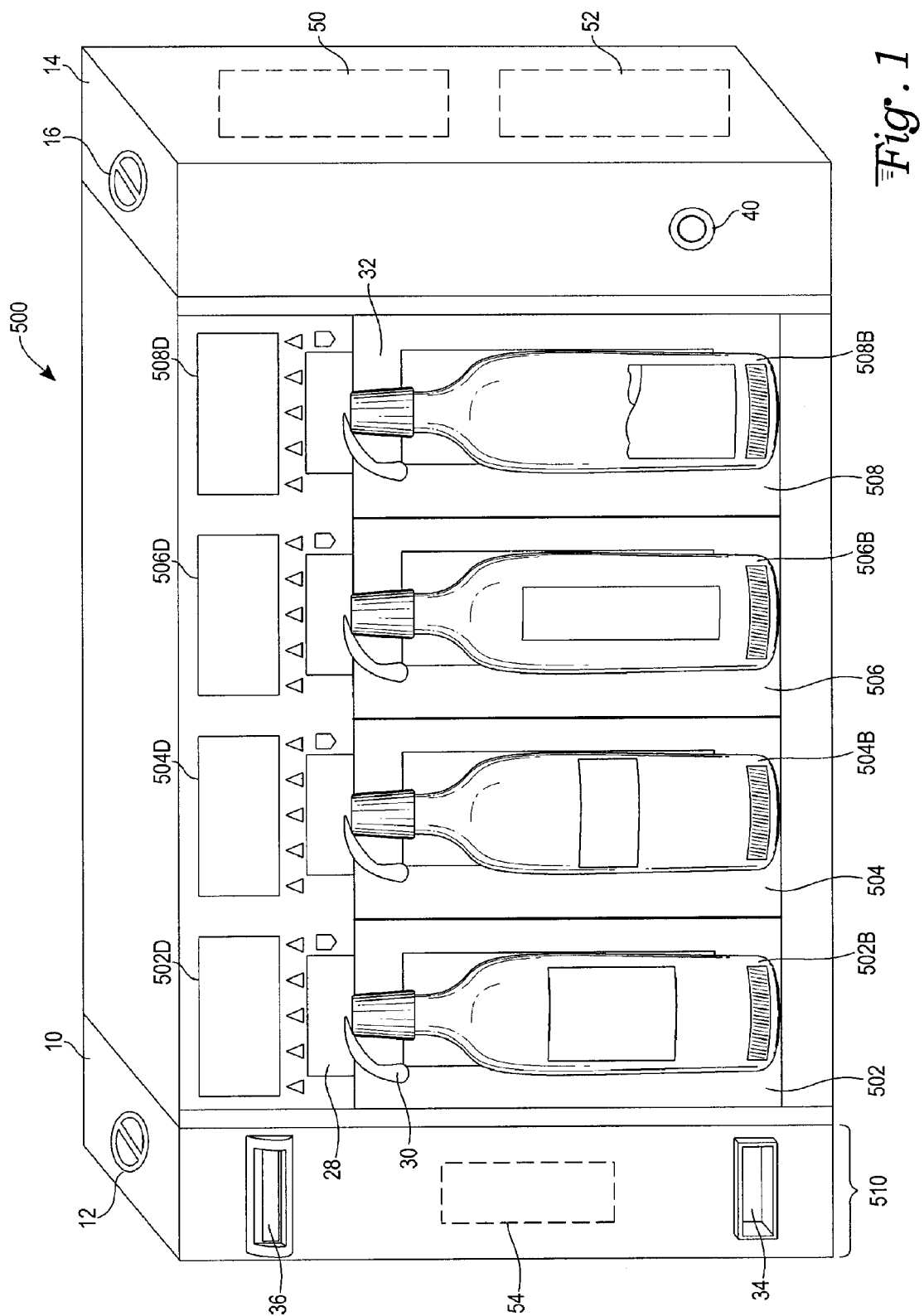
FIG. 1 is a front perspective view of an embodiment of a liquid dispensing device.

With reference to FIG. 1, an embodiment showing a master unit 500 is illustrated. This master unit 500 includes four stalls 502, 504, 506, 508. Each stall is an alcove space configured to hold one bottle such as a wine bottle. Alternatively, all of the wine bottles may be commonly held in a location, a single wine holding compartment. In the present illustration, stalls 502, 504, 506 and 508 hold respective bottles 502B, 504B, 506B and 508B. A front display is located over each stall. As shown, stalls 502, 504, 506 and 508 each have a respective display 502D, 504D, 506D, 508D. This display allows display of information including, but not limited to:

wine varietal
vintage year
name of wine or wine maker
location designation
price(s)
temperature In addition, on the left side indicators may signal including "empty bottle", "empty gas" or "buffer full" if information input exceeds the buffer capacity.

For example, in FIG. 1, the display 502D has a first line indicating a 1999 vintage Zinfandel on the top line of the display. The next line indicates that the wine maker is Rancho Zabaco. The next line indicates that location designation is Healdsburg. Finally the bottom line 34 indicates three prices, $2.50, $5.00 and $8.00. Below each of these prices on the display is a button, 18, 20, and 26 respectively. These buttons allow a user to select an amount of wine pour, for example, a one ounce taste, a 2.5 ounce half glass or a 5 ounce full glass, selected by pressing the respective button 18, 20, 26 located below the price on the digital display. In the bottom corner of the display is the temperature.

At the left side of the master unit 500 is a control unit 510. This control unit may include a card reader 36 that allows payment (for example by accepting credit cards, debit cards, cash, gift cards, smart cards, or other payment types). At the lower level of control unit 510 may be a bar code reader. Access to the control unit may be through a lockable cover 10 having a lock 12. Once the lock 12 is unlocked, cover 10 may be removed and the elements within the control unit, including the bar code reader 34, the card reader 36, and the controller 54 may be accessed. The controller may be a relational database management controller, such as the Informix Dynamic Server sold by IBM.

The controller 54 allows control of the following functions:
1. Card reader processing.

The cards (such as card 908 shown in FIG. 3) inserted into the card reader may be one of several card types. They may be a customer card, an employee card, or a master card. The card reader may read the card and allow for card processing. The card may be a smartcard, in which information is stored on the card itself. The card alternatively may be an account identification card in which information is stored in memory external to the card.

Figure 17:
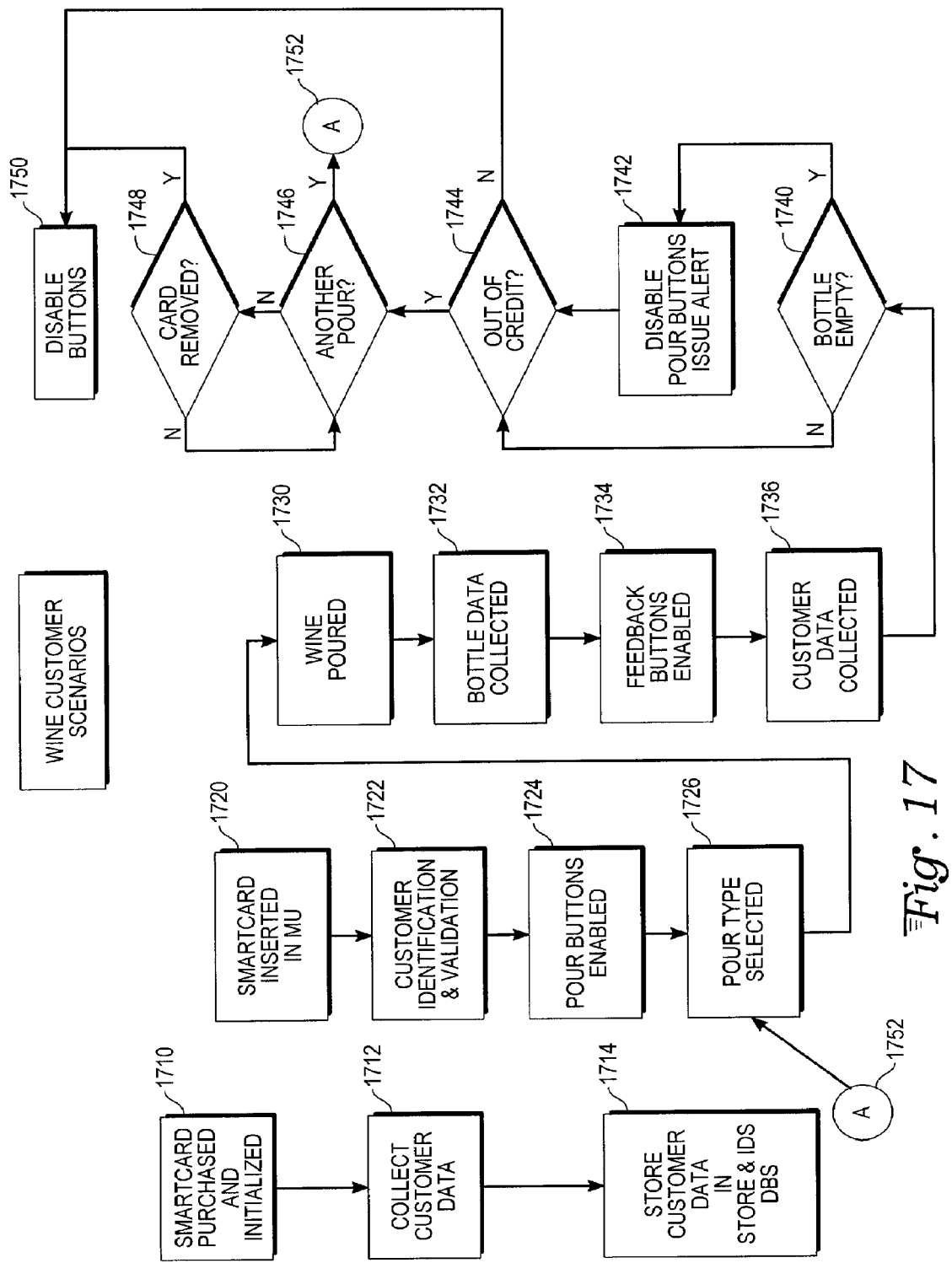
FIG. 17 is a flow chart illustrating steps of using the system.

As shown in FIG. 17, the user card allows a user to select and dispense wine, while the card is debited the purchase amount. The employee card would allow additional access, such as the access to removal and replacement of wine bottles. The master card would allow the greatest level of access, including access to report data.
2. Dispense control.

As will be explained, the controller can activate gas flow and actuate valve rotation. This allows liquid dispensing, using gas to clean the dispense spout, and actuation of a valve assembly to seal a dispense head.
3. Bar code reader control.
4. Data gathering.
5. Display control, including alerts.

Extending across the front of the enclosure is a cover 32. Ideally this would be a transparent cover allowing viewing of the wine bottle 508B. This cover also may act to enclose the stall, such that only the spout on the bottle extends from the cover. The stall may then have efficient temperature regulation, allowing the wine or other beverage bottle to be held at a selected temperature and the liquid to be dispensed at a selected temperature.

On the right side of the master unit 500 is a second lockable cover 14 having a lock 16. Opening cover 14 provides access to an internal refrigeration unit 50 and gas cylinder 52. A gas indicator light 40 indicates when it is needed to replace or recharge gas cylinder 52.

Figure 2:
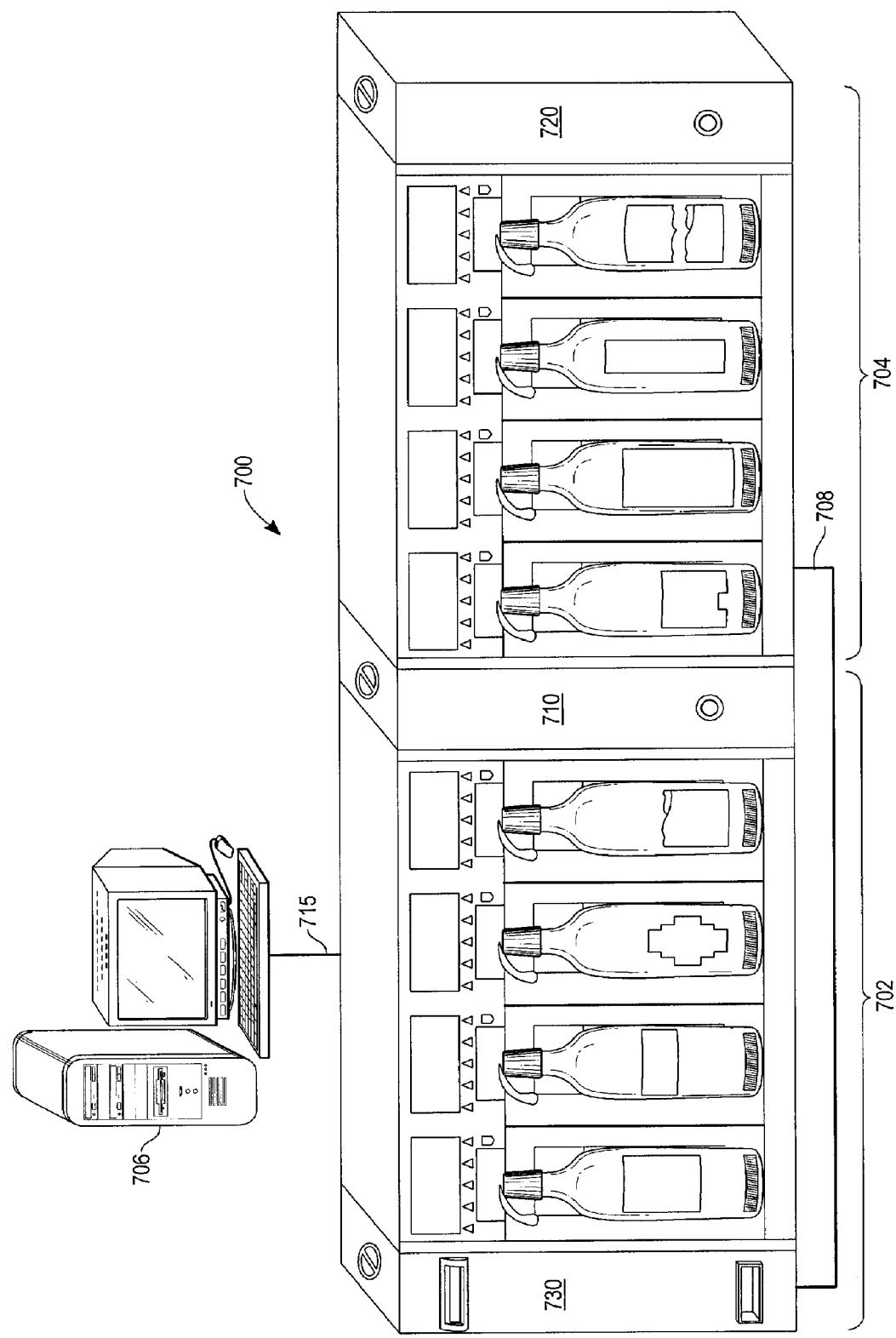
FIG. 2 is a front perspective view of multiple liquid dispensing units linked to a single controller.

With respect to FIG. 2, a master unit 702 is shown joined to an expansion unit 704. Thus two units, each holding up to four wine bottles, can be combined into dispensing system that may hold up to eight wine bottles. Each unit 702 and 704 has a separate right side compartment 710, 720. Compartments 710, 720 each have a lockable cover, and contain a refrigeration unit and a gas supply hookup for each unit. In addition the master unit includes on the left side the control unit 730. As seen in FIG. 1, the control unit may include a card reader, a bar code scanner and have a database management controller. A single control unit may be used to control multiple expansion units, thereby reducing the cost of each expansion unit. A communication linkage 708 allows information to be transmitted between expansion unit 704 and control unit 730. Thus a card can be read at the control unit 730 and the information transmitted to expansion unit 704 to allow dispensing of wine from the expansion unit. Linkage 708 is shown as a wire but may be a wireless connection. Linkage 708 may include a power source for the expansion unit, or a separate power source may be used. Master unit may also be connected to a computer 706 via a connection 715.

The expansion unit may have a number of features of a master unit. For example, the expansion unit, as shown in FIG. 2, may have a display and user control allowing display of information related to the wine or other beverage. The expansion unit may be slaved to or in communication with the master unit having data passed through communication links.

With reference to FIG. 3, a bottle is shown having a dispense head 904 attached. Thus the cork from the wine bottle has been removed, and the dispense head secured at the neck of the bottle. An authorized user may insert a card 908 into card reader 910, allowing access to stall 906 for both insertion and removal of the wine bottle. This card could also allow access to new information on the display 920. This information may include the number of pours, the time the wine bottle was inserted into the machine, the temperature range variation, the total revenue generated, or other information.

The various features and functions of the dispense head (such as the dispense head shown in FIG. 3) are illustrated in FIGS. 4-8. The dispense head is uniquely characterized in having a stopper that is inserted into a wine bottle and allows regulation of the gas within the wine bottle. Thus such a dispense head once introduced into the wine bottle may remain attached to the wine bottle, both when the dispense head (with attached wine bottle) is placed within a dispensing machine and when the dispense head and wine bottle are removed from the dispense machine for storage elsewhere.

The gas within the wine bottle forming a head over the liquid is an inert gas provided by the dispensing machine. This is generally a neutral gas, such as argon or nitrogen, which will inhibit oxidation of the wine. This preservation and prevention of oxidation is advantageous in preventing the undesired degradation of the wine.

Figure 4:
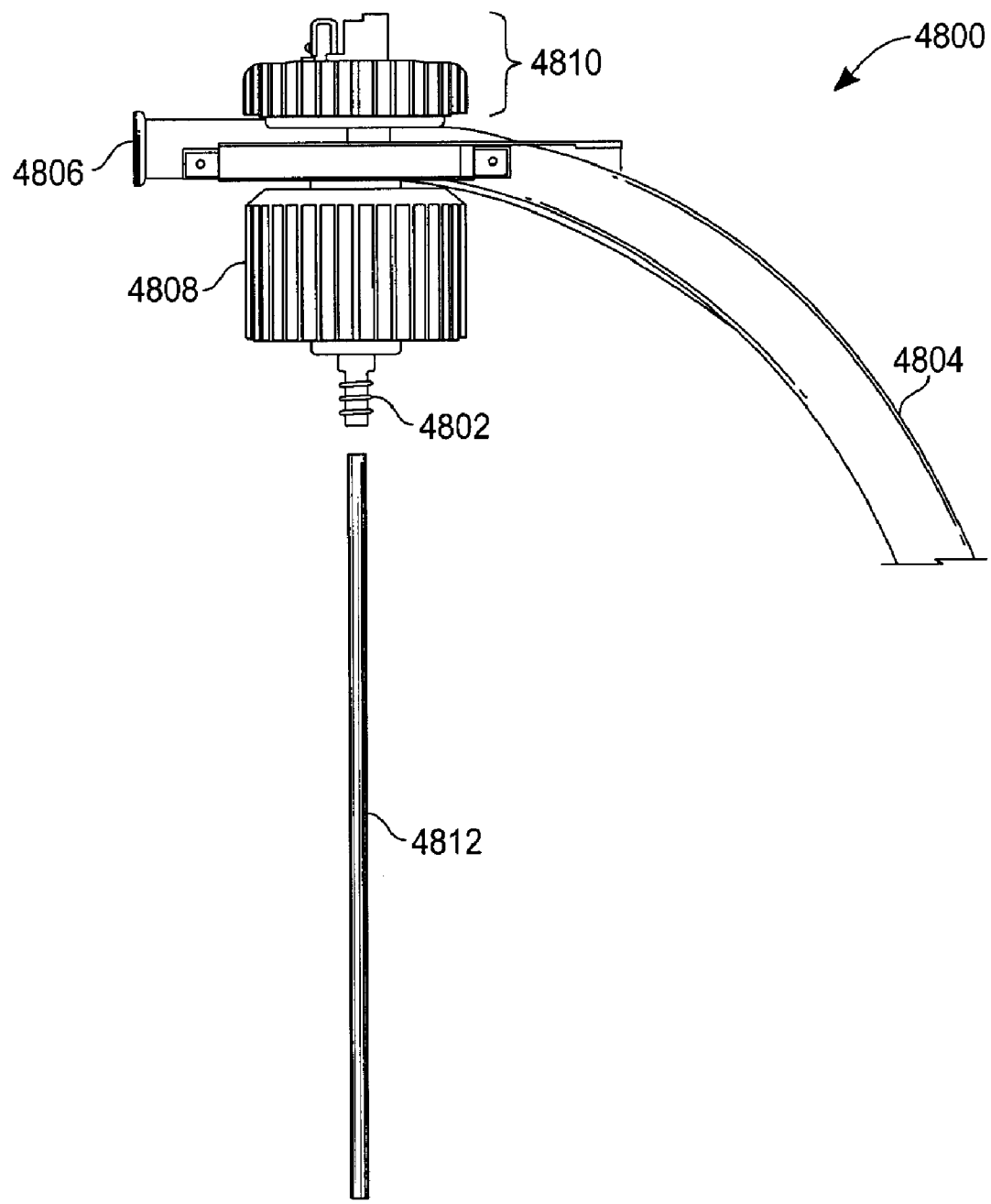
FIG. 4 is a side view of the dispensing head.

With reference to FIG. 4, the dispense head 4800 as shown having a gas input 4806 and dispense spout 4804. In the illustrated embodiment dispense spout 4804 is located on an opposite side of gas input 4806. Gas input 4806 can mate with a gas supply outlet on the dispense machine in a gas-tight fitting thereby ensuring gas availability for dispensing of the wine without gas loss. A tube mount 4802 allows mounting of a liquid intake tube 4812 to the dispense head. The tube should be sterile and have a length suitable for the bottle onto which the dispense head is mounted. A cap 4808 is designed such that when tube 4812 is inserted into the bottle, cap 4808 extends over the top of the bottle. In this illustrated embodiment, gas input 4806 is located opposite dispense spout 4804. Thus when this dispense head is placed over a bottle and the bottle installed in a dispensing machine the gas input 4806 faces the interior of the stall to mate with a gas supply source and the dispense spout faces out of the stall to allow pouring into a user's glass. It would be apparent that the gas connection may be anywhere within the three sides of the stall. However, a back wall gas connection is simplest for bottle mounting and latching.

The top of the dispense head is a valve assembly 4801. This valve assembly allows the selective control of gas and liquid flow. The selective rotation of the valve assembly can for example allow purging of the liquid within the wine bottle, the displacement of controlled volumes of liquid from the bottle to the dispense spout 4808, or the cleaning of the dispense spout 4808 using a puff of gas.

Figure 5:
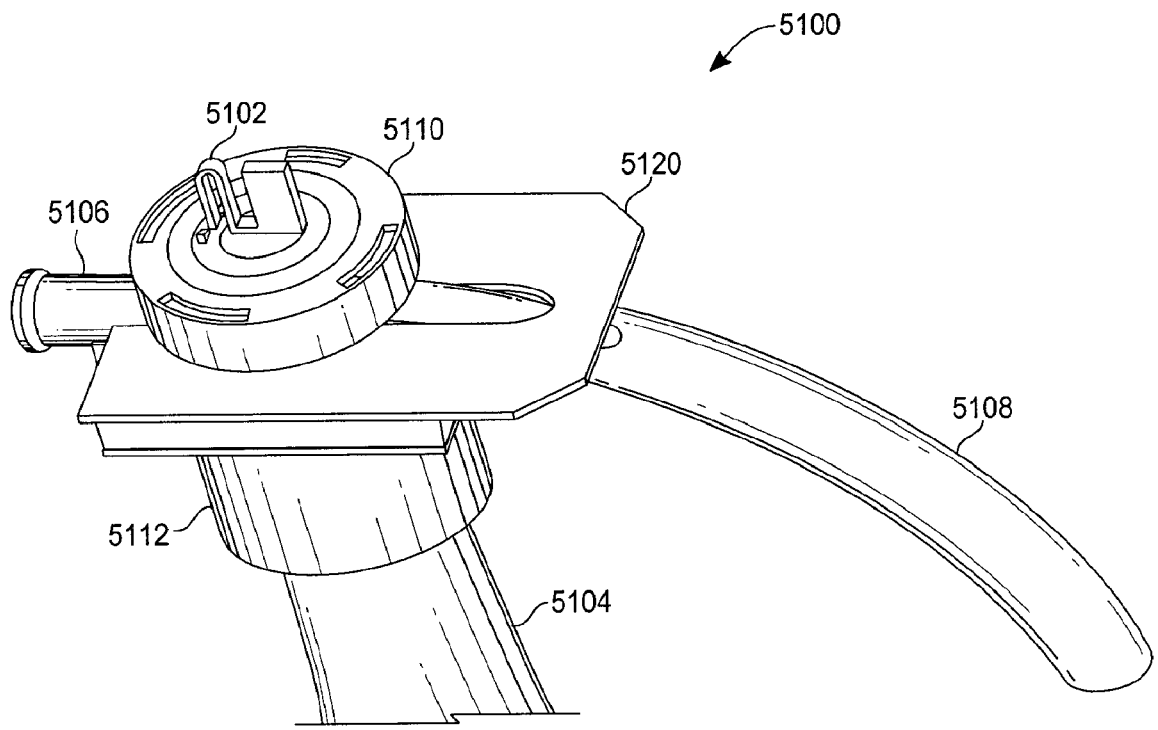
FIG. 5 is a top perspective view of the dispensing head.

FIG. 5 shows an alternative view of the dispense head. In this view dispense head 5100 has a body 5120 from which extends the gas input 5106 and the dispense spout 5108. The cap 5112 on body 5120 is secured over the neck of a wine bottle 5104. The valve assembly 5110 includes a valve rotation tab 5102. Valve rotation tab 5102 may be engaged by a motor, such as stepper motor to rotate the valve according to controller instructions.

Figure 6:
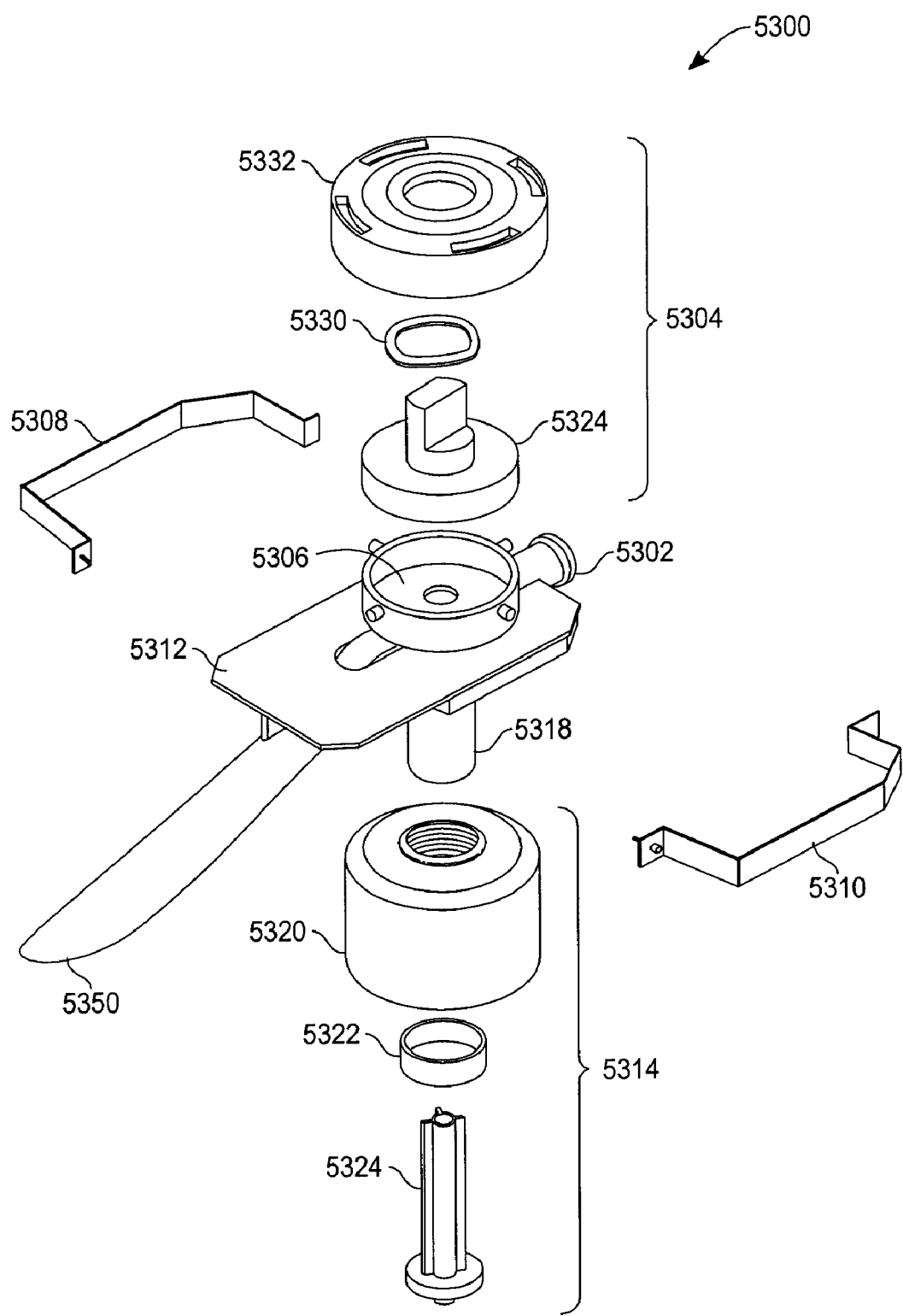
FIG. 6 is an exploded view of the dispensing head.

The exploded view of FIG. 6 illustrates the dispense head 5300 having a valve assembly 5304. This assembly includes an outer ring cap 5332 and inner o-ring seal 5330 and a rotating valve 5334. This valve assembly 5304 seats in the valve mount 5306. Gas input 5302 allows gas flow to the valve mount 5306 such that channels on rotation valve 5334 control the gas flow. Valve 5334 may channel the gas through a downward channel through stopper 5318 and into the bottle. Alternatively, the gas flow brought in through gas input 5302 and directed by rotating valve 5334 may be directed through dispense spout 5350. This allows either the injection of a volume of gas into the bottle to dispense fluid from the bottle, or allows sending a puff of gas through dispense valve 5350 mounted on body 5312 to clear dispense spout 5350 of any residual liquid.

Mounted on stopper 5318 is cap 5320, secured by retainer 5322. Inserted in stopper 5318 is intake tube mount 5324. Intake tube mount 5324 allows mounting of an intake tube that extends to the bottom of a wine bottle. When gas flows into the wine bottle through stopper 5318 the pressurized gas drives an amount of wine into the intake tube attached to intake tube mount 5324. Rotating valve 5334 provides a pathway of this displaced liquid to flow through the dispense spout 5350 and into a user's glass.

From this construction it can be understood that as opposed to other machines which require flow-through tubing that was integral to machine, the present system has the advantage of providing a dispense head which is self-contained and allows relatively few components to contact the wine. These components are limited to the intake tube, the dispense spout 5350 and some of the pathways on the rotating valve 5334 (other pathways on the valve assembly only channel gas). The dispense head is sufficiently simple and inexpensive to make that this might be a disposable part. Alternatively the construction of relatively few durable plastic parts could allow simple sterilization and cleaning, perhaps in a dishwasher. Unlike other systems, the system embodiments described never needs to be taken out of commission for cleaning and sanitation cycles. Instead new wine bottles can be added using clean dispense heads. The used dispense heads may be cleaned separately.

Figure 7:
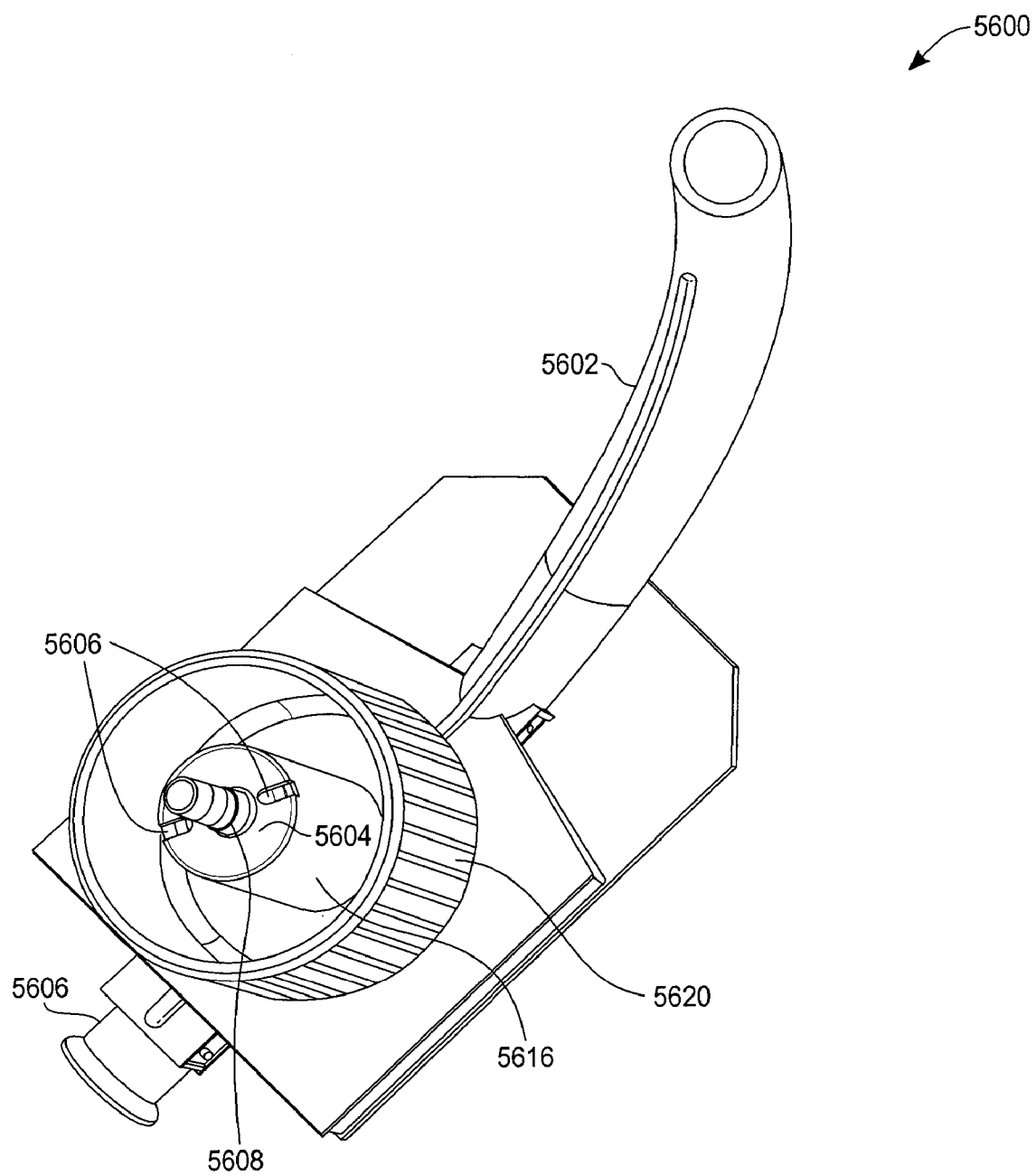
FIG. 7 is a bottom view of the dispensing head.

With reference to FIG. 7 the underside of the device shows the dispense spout 5602 and the gas intake 5610. The stopper 5604 is inserted in a bottle of wine and the cap 5620 is disposed about the neck of the bottle. The stopper may have a plurality of tapering ridges 5616 to allow a tighter fit into the neck of the bottle, and allows the stopper to be able to be used with some variation in bottle neck size. Gas ports 5606 allow introduction of the gas regulated by the valve into the bottle through the underside of stopper 5604. This gas is introduced at the top of the bottle. This is advantageous because the gas would form a head over the liquid without bubbling through the liquid or having the gas ports contact the liquid within the bottle.

Figure 8:
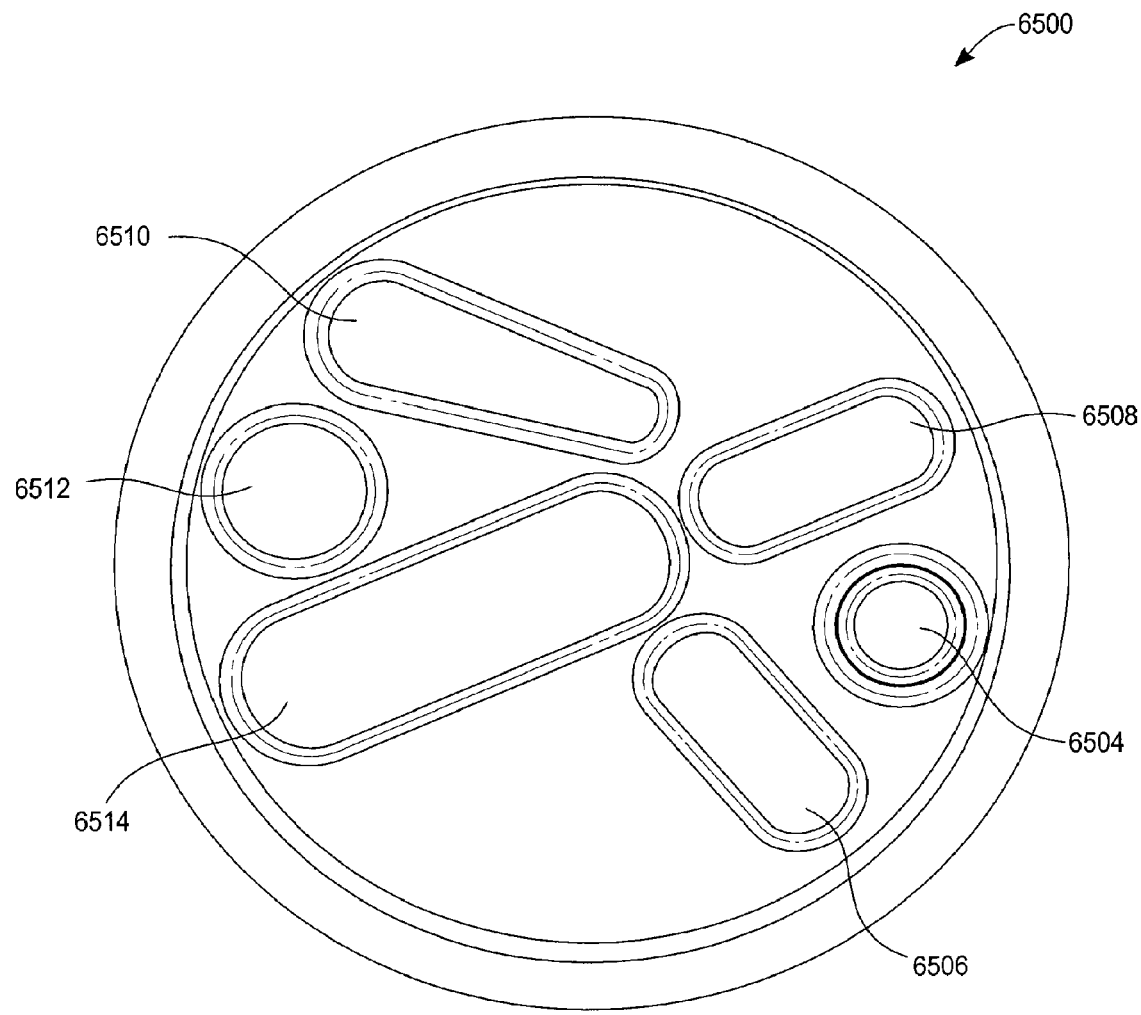
FIG. 8 is a bottom perspective view of the dispensing head rotational valve.

The rotating valve 6402 is showing greater detail in FIG. 8. As can be seen on the underside of the rotating valve a plurality of pathways 6404 were molded into the rotating valve. It is inherent from FIGS. 4-8 that the positioning of these pathways and with the intake tube, stopper gas inlets, pour spout and gas intake (as illustrated) that the present rotation valve would allow retention onto a bottle, sealing of the bottle from gas inflow or outflow, gas driven liquid dispensing, a gas purge of gas from within a bottle, or a gas "puff" to clear a dispense spout. The pathways of the rotating spout may be aligned with the dispense spout, liquid intake tube, and gas input shown in FIGS. 4, 5, and 6. From this view of the various pathways the following function are inherently available.

1. Valve is rotated to block both the dispense spout and the gas intake. In FIG. 8, this would, for example, mean that recessed area 6504 is located over the gas inlet opening, and location 6512 is located over the spout opening. This effectively seals the bottle with the dispense head functioning as a cork and maintains the pressurization within the bottle. The bottle may then be removed from a dispense system and placed in storage. The dispense head is retained on the bottle by simple frictional resistance, the valve would remain its position unless moved by a motor. If the pressurized gas (such as an inert gas like argon or nitrogen within the bottle has been introduced into the bottle by the system the wine in the bottle will not oxidize and may be served at another date.

2. The valve may be rotated to allow gas injection through the intake tube and venting of gas through the stopper and dispense spout. In FIG. 8, this would, for example, be effected by rotation of the valve such that recessed area 6506 would provide a passageway for gas from the opening of the gas intake to flow into a first stopper gas inlet. A second recessed area 6510 would connect the second stopper gas inlet to the dispense spout. This would allow a replacement of the head of air in the bottle with the neutral gas provided by the system. The gas would flow from the gas source, into the bottle through a first stopper gas inlet, out the second stopper gas inlet and then be vented through the spout.

3. For dispensing, the valve would be rotated to allow gas flow through the stopper and liquid flow through the intake tube to the dispense spout. With reference to FIG. 8, this would be effected by aligning recessed area 6508 to connect the opening from the gas inlet to the stopper gas inlet. This would allow gas flow into the bottle, and allow fluid to be displaced. Recessed area 6514 would connect the intake tube top opening with the pour spout, providing for the displacement of a selected volume of liquid. The volume of the gas flowing into the system will determine the volume of liquid dispensed.

4. Alignment of the valve such that gas from the gas intake flows directly to the dispense spout bypassing the stopper. This would allow a brief puff of air to clear the remaining fluid in the line ensuring that the pour is at the proper volume and that the wine is not contaminated. This would be effected by the controlled rotation of the valve as per number 2 above. The valve configuration for "purging" the gas from bottle after opening would also allow for a "puff" to clear any residual liquid in the pour spout with a short puff of gas from the gas source.

Figures 9, 9A:
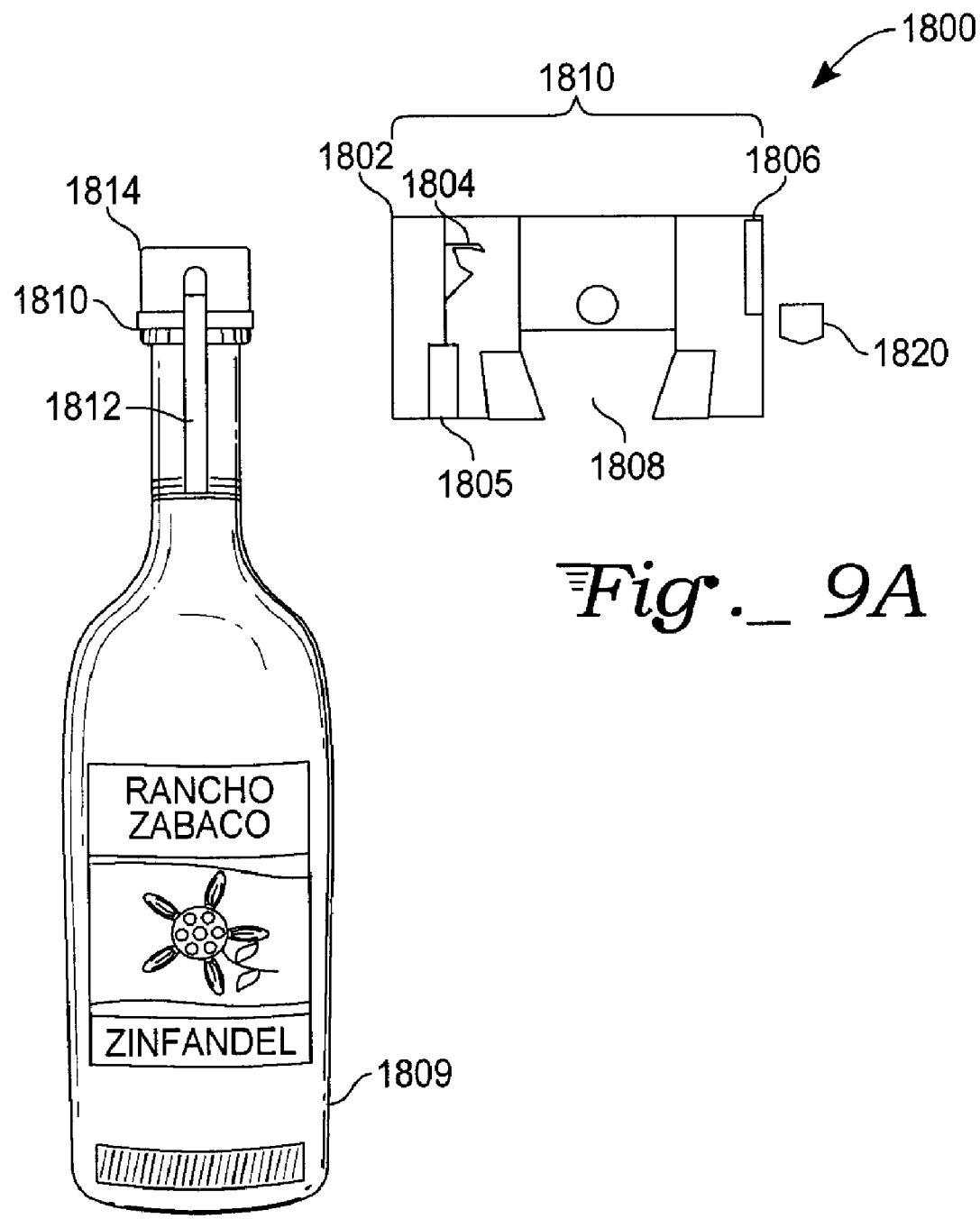
FIG. 9 is a side perspective view of an embodiment of the dispensing head.
FIG. 9A is a front view of dispensing head and a loading bay.

The disclosure of the dispense head provides a unique self-contained method of dispensing liquids. The dispensing machine needs to provide only a gas source with the fluid control provided entirely in the dispense head as previously noted. This has a number of advantages including reduction of contamination and easy removal of the bottles from the system. It also aids in securing the bottle within the machine. With reference to FIG. 9 a partial view of machine 6600 shows a plurality of bay doors 6604. These bay doors may be open and the wine bottle with dispense head inserted into a stall. A nose 6604 extends over the dispense spout. A stepper motor 6606 engages with the tab on the rotating valve as seen in FIGS. 6 and 8.

The bay with the door open is shown in FIG. 9a. This figure shows a wine bottle 1809 having a dispense head mounted to the neck of the bottle. A dispense spout 1812 extends from the front of the bottle secured to body 1810 of the dispense head. At the top of the dispense head is a valve assembly 1814. An authorized enabled user may push a latch button such one of the buttons shown in FIG. 1 to unlock door 1802. Bay door 1802 may be attached by hinges and secured by latch 1804 which fits into catch 1806. Opening the door reveals a dispense head slot 1808 in which the dispense head 1810 may fit. The size of the stall that surrounds the bottle on three sides would preclude removal of the bottle without opening bay door 1802. This latching process also completes the seal of the bottle with the gas fitting in the back of the stall engaging the dispense head when the bottle having the dispense head is inserted. Upon authorization button 1820 may be pressed to enable opening the bay door 1802. As shown in FIG. 9, the bay door may include a "nose" protrusion into which the pour spout fits. This allows a longer bay door and a greater amount of security.

Figure 10:
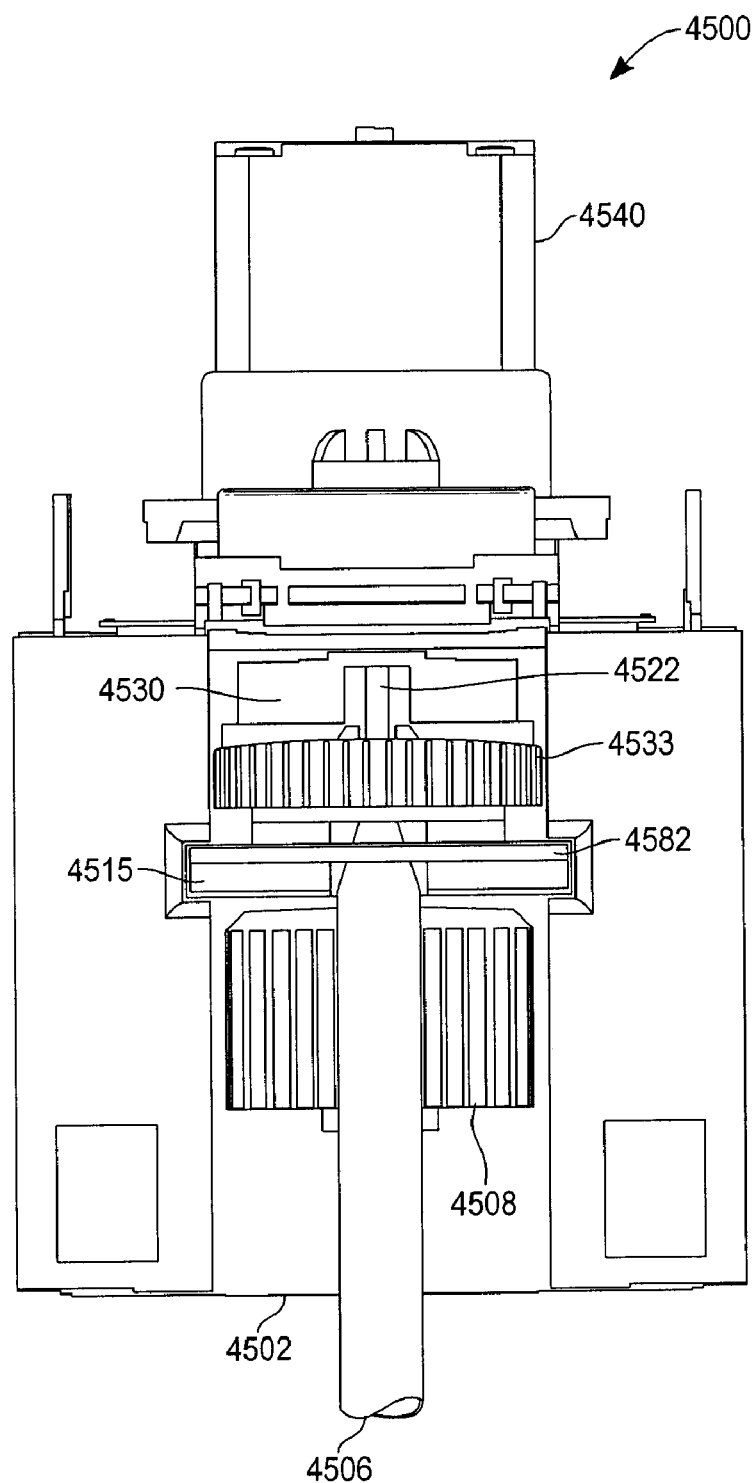
FIG. 10 is a front view of the dispensing head and the motor for engaging the dispensing head.

With reference to FIG. 10 the dispense head 4502 includes a pour spout 4506 and a cap 4508. The dispense head 4502 has a body 4512 which fits into a slot 4582. On dispense head 4502 a rotating valve 4533 includes a drive tab 4522 that is engaged by a drive head 4530. This drive head 4530 is mechanically linked to stepper motor 4540. This allows selective control of the valve. It will also be realized that once drive head 4530 is rotated this configuration, along with the latch door, effectively precludes removal of the wine bottle providing multiple levels of security.

The present dispense head may be simply secured over a wine bottle. The dispense head is inserted into the wine bottle and dispensing is driven by gas from the system. However, the bottle and dispense head may be removed from the rest of the system quite easily and quickly. The flow from the bottle is driven by an inert gas such as argon or nitrogen.

The following features may be part of various basic embodiments of wine preservation: a refrigeration unit, automated wine preservation, automated pour control, wine transaction tracking, customer smartcard control, employee smart card control, unit management, LCD wine identification display, merchandising management, product/brand management, site location management, customer marketing management, inventory management, distributor/wholesaler management, auto-latch security, UPC/barcode database management, and wine rating management.

In one embodiment, the present invention provides a way that wine and other liquids can be dispensed at predefined volumes using a preserving gas. It also provides a system for capturing, presenting, managing, and reporting data and information related to dispensing liquids.

In one embodiment of the invention a dispensing head is used to dispense the liquid. In various embodiments of the dispensing head, it may be designed to have a variety of features. The dispensing head may be disposable, which eliminates the need for cleaning the dispensing unit. The dispensing head once inserted into the dispensing unit enables the purging of the initial air that is present in a bottle when it is first opened, by replacing this air with an inert gas such as nitrogen or argon. Once this purging is complete the dispensing head is sealed preventing air from reentering the bottle.

The bottle can then be served in predefined measured volumes by pressing a button on the dispensing unit. The button signals the unit to pour the desired volume by starting the flow of the inert gas into the bottle and displacing the desired liquid into a waiting glass at the dispensing head spout. The dispensing head, after it has poured the desired volume into the glass, performs a puff function using the inert gas to clear any liquid that remains in the dispensing head spout. After the initial purging of the original air in the bottle, the bottle can also be removed at any time from the dispensing unit and be stored for later use due to the dispensing head's ability to prevent air from reentering the bottle either through the gas intake or the dispense spout, hence preserving the liquid. The dispensing head also may have a built-in detection mechanism to ensure that the proper volume is being served. One such way to detect the volume is by detecting the liquid in the dispensing head spout by detecting a current through the liquid as it is pouring.

It would be inherent from sensing bands 5308 and 5310 as illustrated in FIG. 6 how these bands could be adopted for the detection of current. The sensing bands 5308 and 5310 are on either sides of the dispense heads. The illustrated "C" shape of the sensing bands 5308 and 5310 allow the bands to be positioned on two sides of the dispense head without making physical contact. To detect current through the liquid, the sensing bands must make contact with the liquid in the dispense head. The sensing bands 5308 and 5310 are shown having nibs on the front ends of each band. These nibs extend into the spout, where they are sealingly positioned. The system can introduce a current source between the sensing bands, and monitor the rate of change in voltage across the bands. This method enables detection of the difference between gas and liquid between the bands, even small gas bubbles within the liquid may be accurately detected by the change in rate of change of voltage.

It would be inherent that such detection would have a number of advantages. The detection would be both sensitive and very rapid. As noted above, the flow of liquid is controlled by introduction of gas flow into the wine bottle through a dispense head. The gas flow is at a regulated flow rate and controlled by a solenoid valve for a selected duration. The monitoring allows detection of any error in dispensing. From the above figures and descriptions, it would be understood that some check to make sure gas supply, dispense head functioning, or other system error would be an advantage. In addition, a check to make sure that a wine bottle is not empty would also be an advantage of some embodiments. The detection provides a simple and robust device and method for just such error detection.

The dispensing head also has a built-in mechanism that detects that it is properly positioned in the dispensing head bay. One way this may be accomplished is through electrically detecting the proper positioning of the head in the unit. In FIG. 6, sensing bands 5308 and 5310 flank the valve assembly. These could contact the mount in the bay when the dispense head is properly positioned. The dispensing head also has a gas intake mechanism that aligns with the inert gas valve that ensures that it is properly engaged into the dispensing head unit. The dispensing head also has a head locking mechanism built into the rotor and cap portions of the head and prevent a person from accidentally opening the dispensing head and exposing it to the air when the bottle is removed from the dispensing unit. The reason that someone would want to remove a full or partially opened bottle from the dispensing unit is for pre-staging purposes or for the flexibility of changing to offer other wine or liquid dispensing before the entire bottle has been entirely been served.

Figure 11:
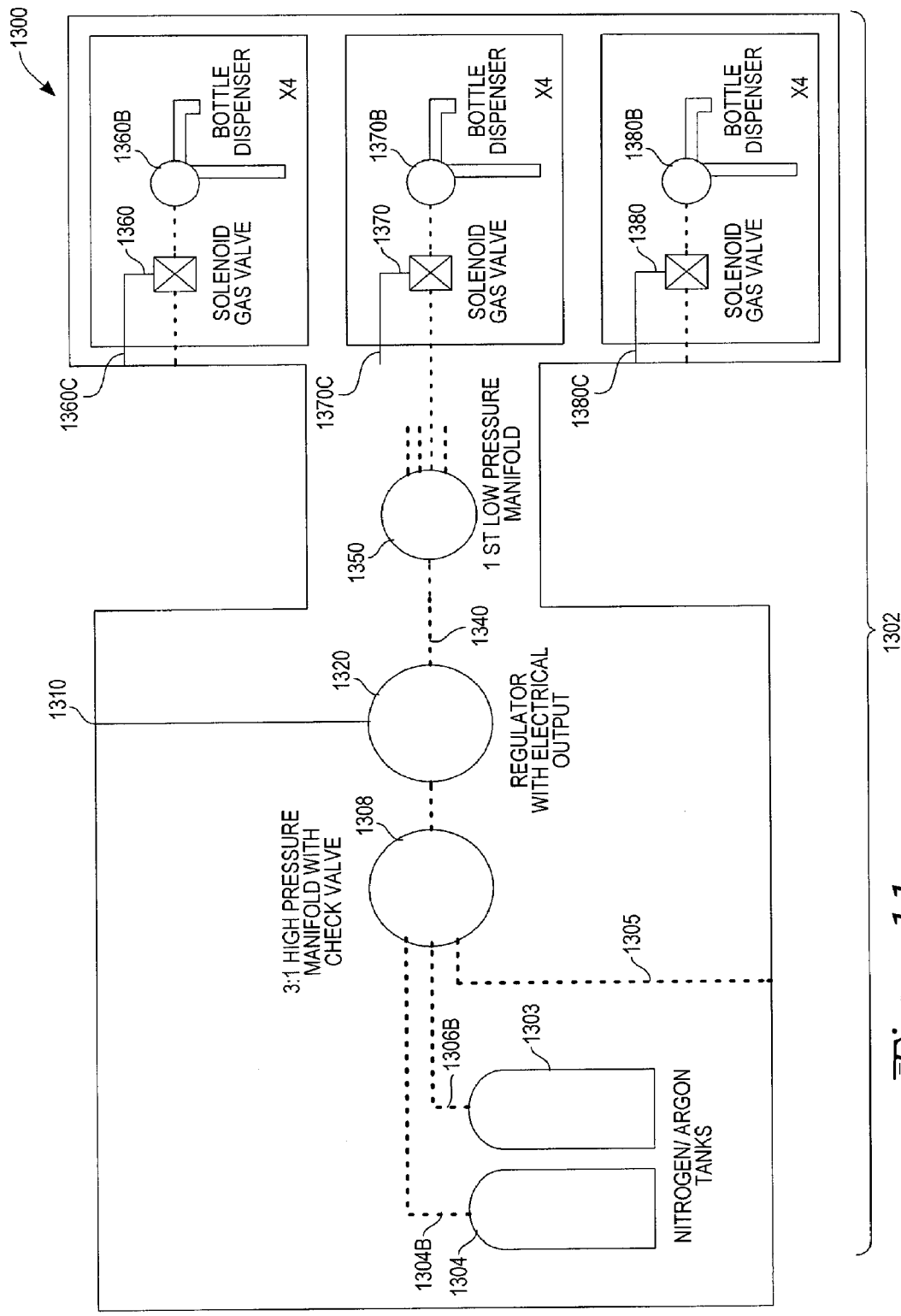
FIG. 11 is a schematic showing gas flow.

With reference to FIG. 11 gas tanks 1304, 1303 may provide the gas source. Alternatively gas line 1305 could allow connection to an gas source that is external to the device. A 3:1 high-pressure manifold with a check valve combines the gas from various sources into a single output line. The gas tanks 1304, 1303 are connected to this 3:1 high pressure manifold 1308 by gas lines 1304*b*, 1306*b*, respectively. The manifold 1308 feeds the high-pressure gas to a regulator 1320. The output regulator allows flow via the connection 1310 to the control system. It could also be linked to the indicator light or other indicator system showing gas pressure is low and requires maintenance. The gas passing through regulator 1320 is connected by line 1340 to 1:4 low-pressure manifold. This manifold 1350 divides the single gas source into 4 different lines supplying each of four stalls in the dispensing machine as shown in FIGS. 1 and 2. Each of the individual gas lines is connected to a solenoid 1360, 1370, 1380, which are electrically controlled by wires 1360*c*, 1370*c*, 1380*c*, respectively. If the solenoids are open, gas can flow to respective dispense heads 1360*b*, 1370*b*, 1380*b*. By controlling the opening of the solenoid and flow of gas, selected amounts of wine can be dispensed.

Figure 12:
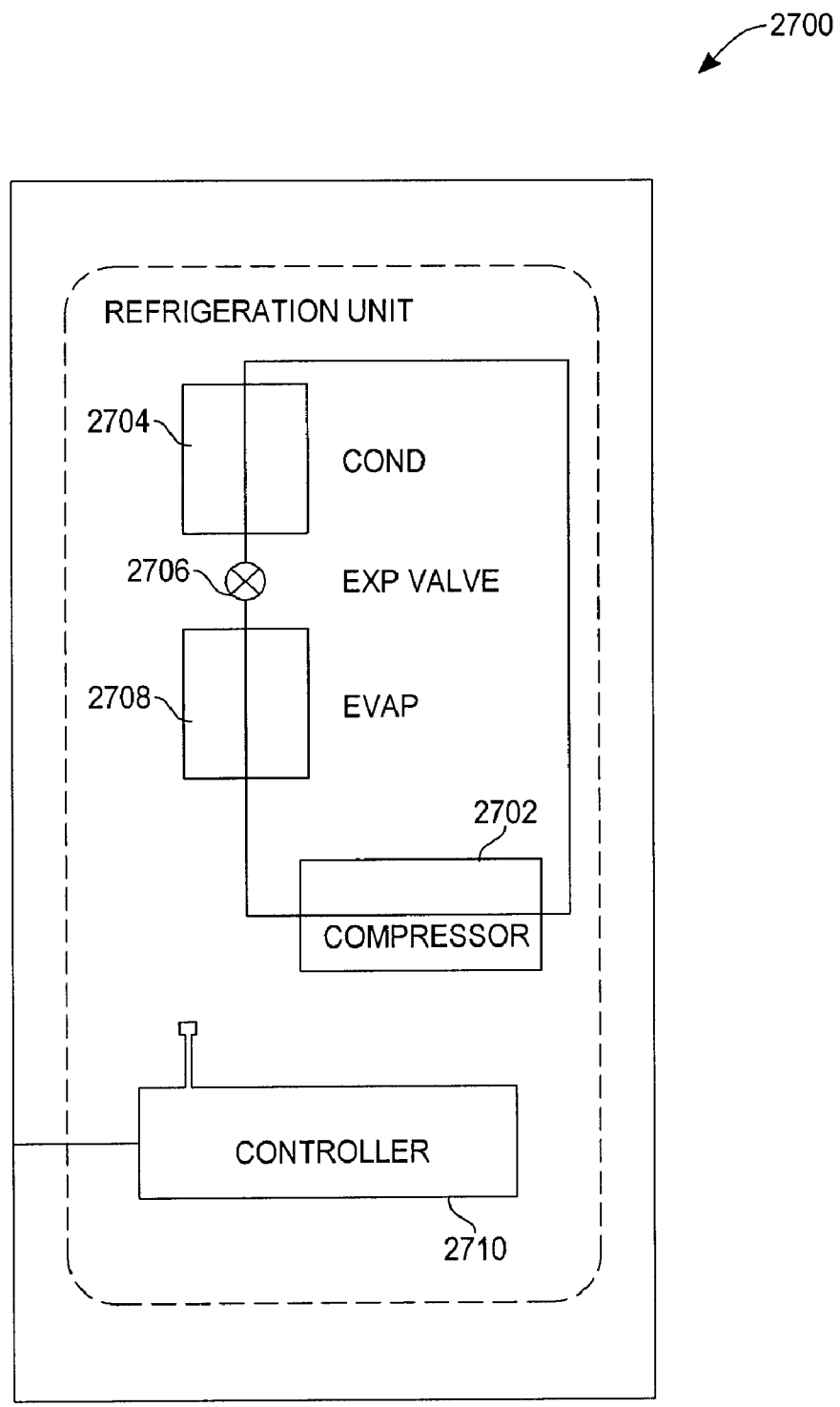
FIG. 12 is a schematic showing refrigeration.

With respect to FIG. 12 a refrigeration unit 2700 includes a compressor 2702 having a plurality of tubes which lead to the stall 2704. A valve 2706 regulates flow of air through trap 2708. The controller 2710 is electronically linked to the compressor and valve to regular operation and allow for temperature control in each of the individual stalls. Other temperature regulation methods are possible.

The present system allows for a substantial amount of information leveraging as will be explained in respect to FIGS. 13, 14, 15, and 16. With respect to FIG. 13 a master unit controller 2904 includes a base unit intelligence 2920. Base unit intelligence 2920 would include the firmware, including the pouring controls, activation of pouring and control of pouring buttons. It will also include gas control, refrigeration control, manual bottle latching, data logging and LCD display including display of critical events, pour option, and temperature. The master unit controller 2904 would also have an online service interface module 2930 allowing connection to a global computer network 2932. This would allow for remote debugging of the system, installing upgrades, as well as downloading patches. The master unit controller would also include a master unit database interface 2922. This would provide for data caching, database downloads, and downloads of logs. This would have a secure interface and be in communication with the master unit barcode module 2924 and the master unit smartcard module 2926. In addition the master unit database interface 2922 would also be in communication with an external PC 2902 allowing it to move data to the database application 2906 running on external PC 2902. Also in the master unit controller is the master unit barcode module 2924. This would include the master unit barcode software and a universal product code lookup, pricing lookup, display functionality, and data interface software. This would enable wine code downloading as well as automated event downloading. The master unit smartcard module 2926 includes the smartcard software, employee authorizations, and an automated launching system. The master unit database interface on master unit controller 2904 is linked to the database application 2906 on the external computer 2902. Database application 2906 is a software module that creates the database, transferred log entries into the database, provides interface with other secure databases. These databases may include an event database 2910, an employee database 2912, a wine and pricing database 2914, and a customer database 2916.

Figure 13:
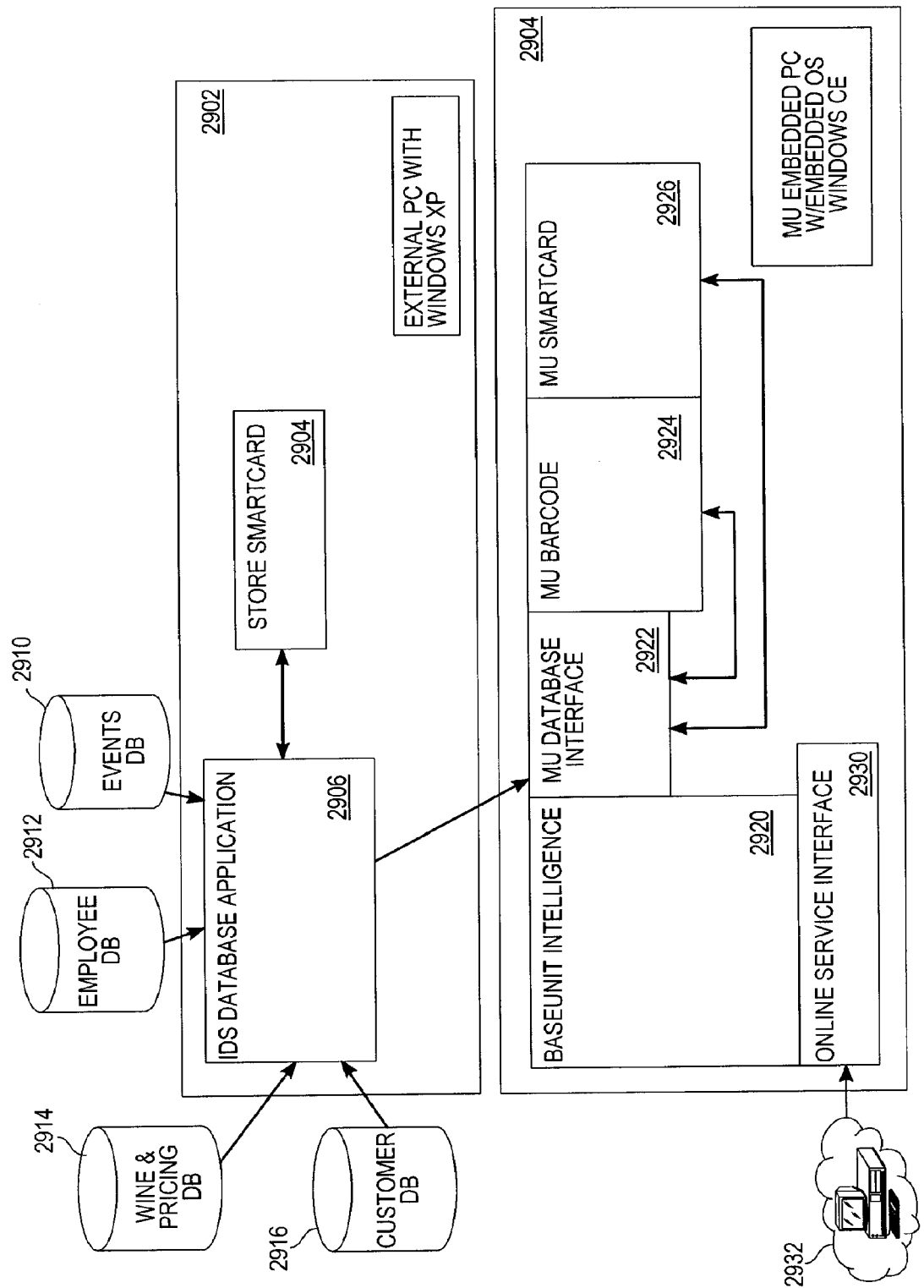
FIG. 13 is a cartoon of a software design shown with an external computer.
Figure 14:
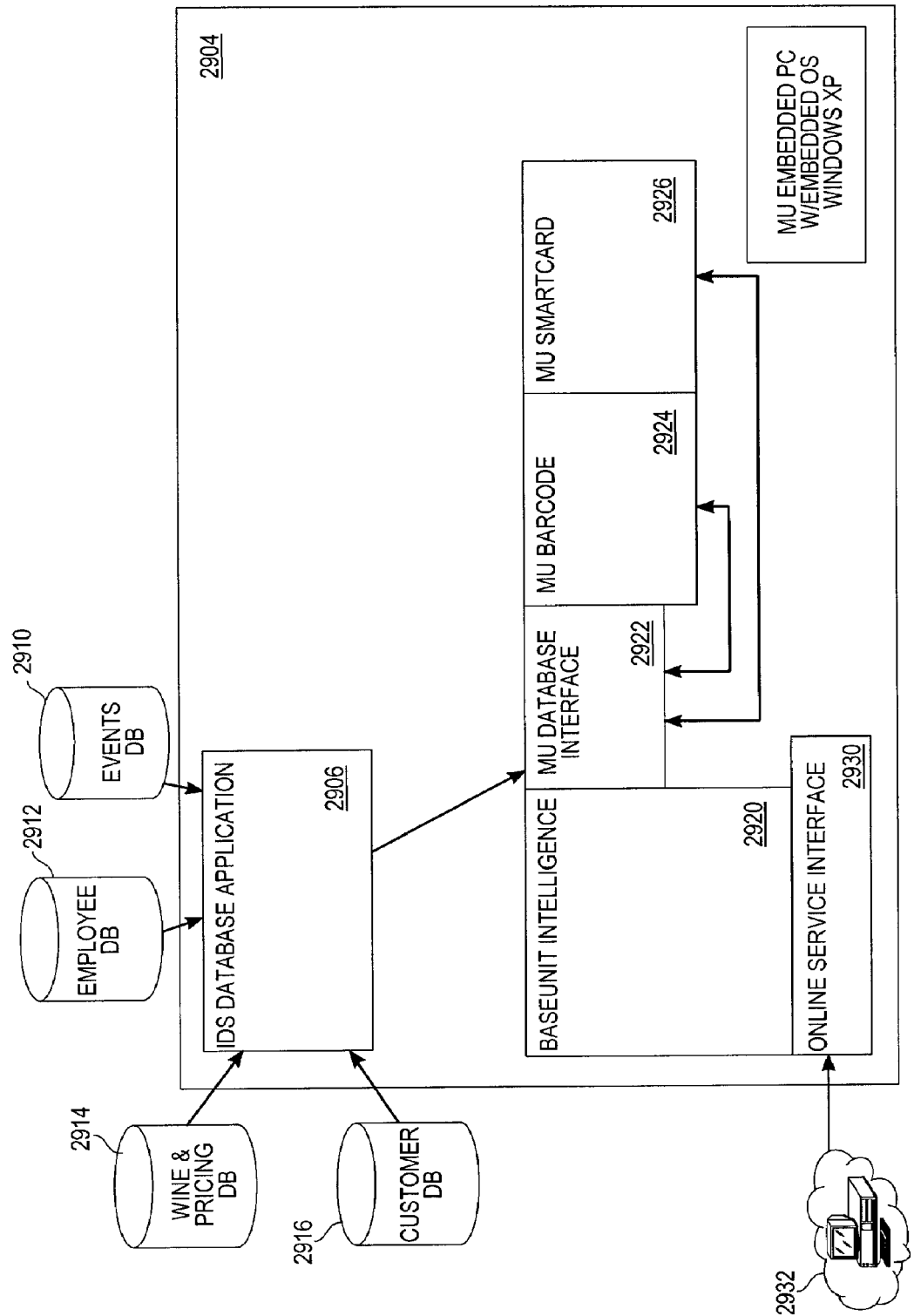
FIG. 14 is a cartoon of a software design shown without an external computer.

With reference to FIG. 14 the controller and controller modules remain the same but in this instance the master unit embedded controller 2904 also includes the database application 2906 and the related databases as explained in the FIG. 13. Again, the controller may have an on-line service interface 2930 that allows contact with a global computer network 2932.

Figure 15:
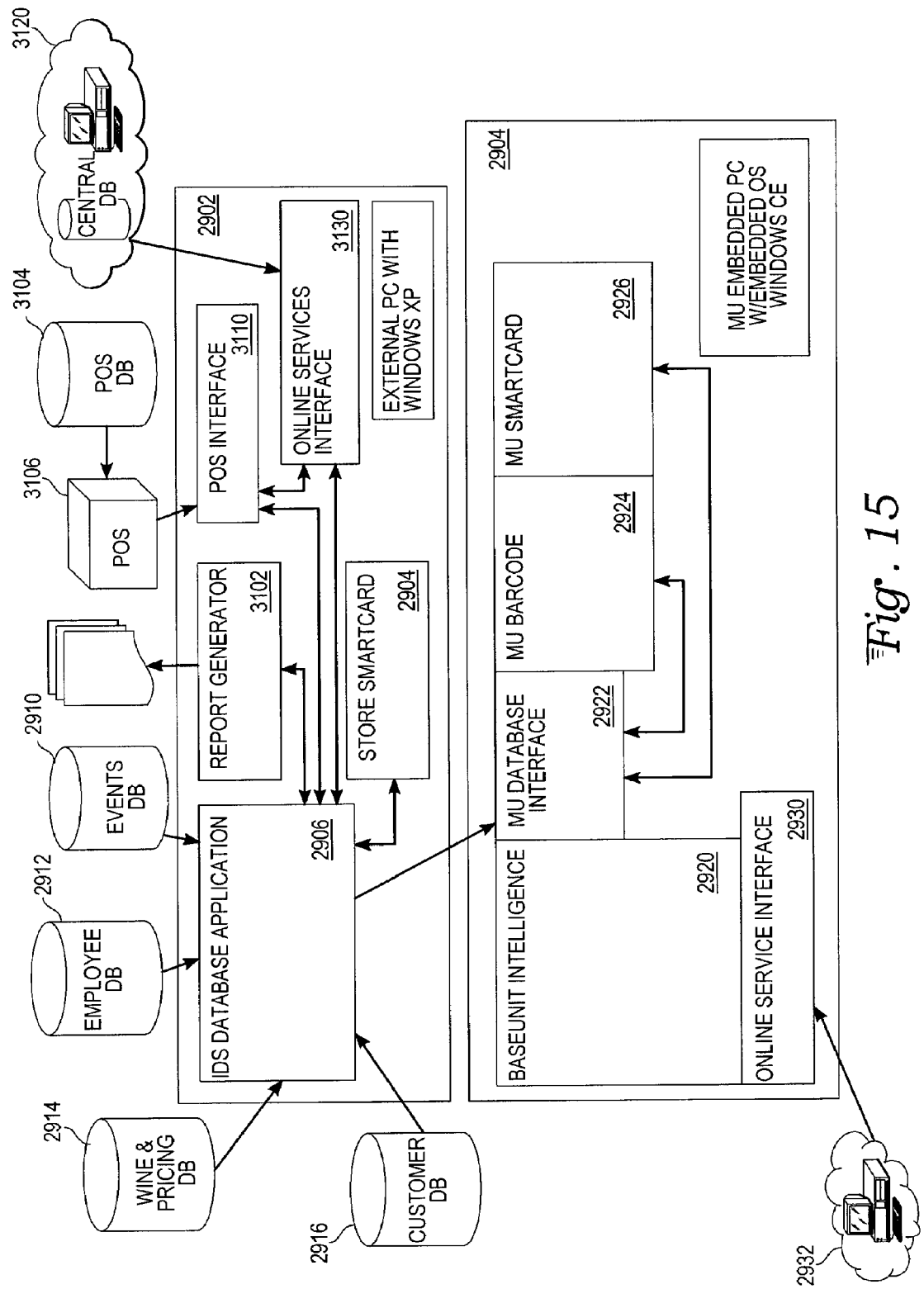
FIG. 15 is a cartoon of a software design shown having an external computer.

An expanded database system having an external PC is illustrated in FIG. 15. As in FIG. 13 the master unit embedded controller 2904 and associated modules remains the same. As in FIG. 13 the master unit database interface 2922 is linked to a database application 2906 that communicates with a number of databases. In this embodiment a report generator 3102 allows predefined reports from the databases to be generated. The database application 2906 also has communication with a point-of-service interface 3110 allowing transaction calls and database interface calls. The point-of-service interface 3110 is in communication with a point-of-service 3106 that may have a point-of-service database 3104. The external PC also has an on-line service interface linked both the point-of-service interface 3110 and the database application 2906. This on-line service interface 3130 may communicate with a central database 3120. In addition the on-line service interface may also allow login services and central portal services.

Figure 16:
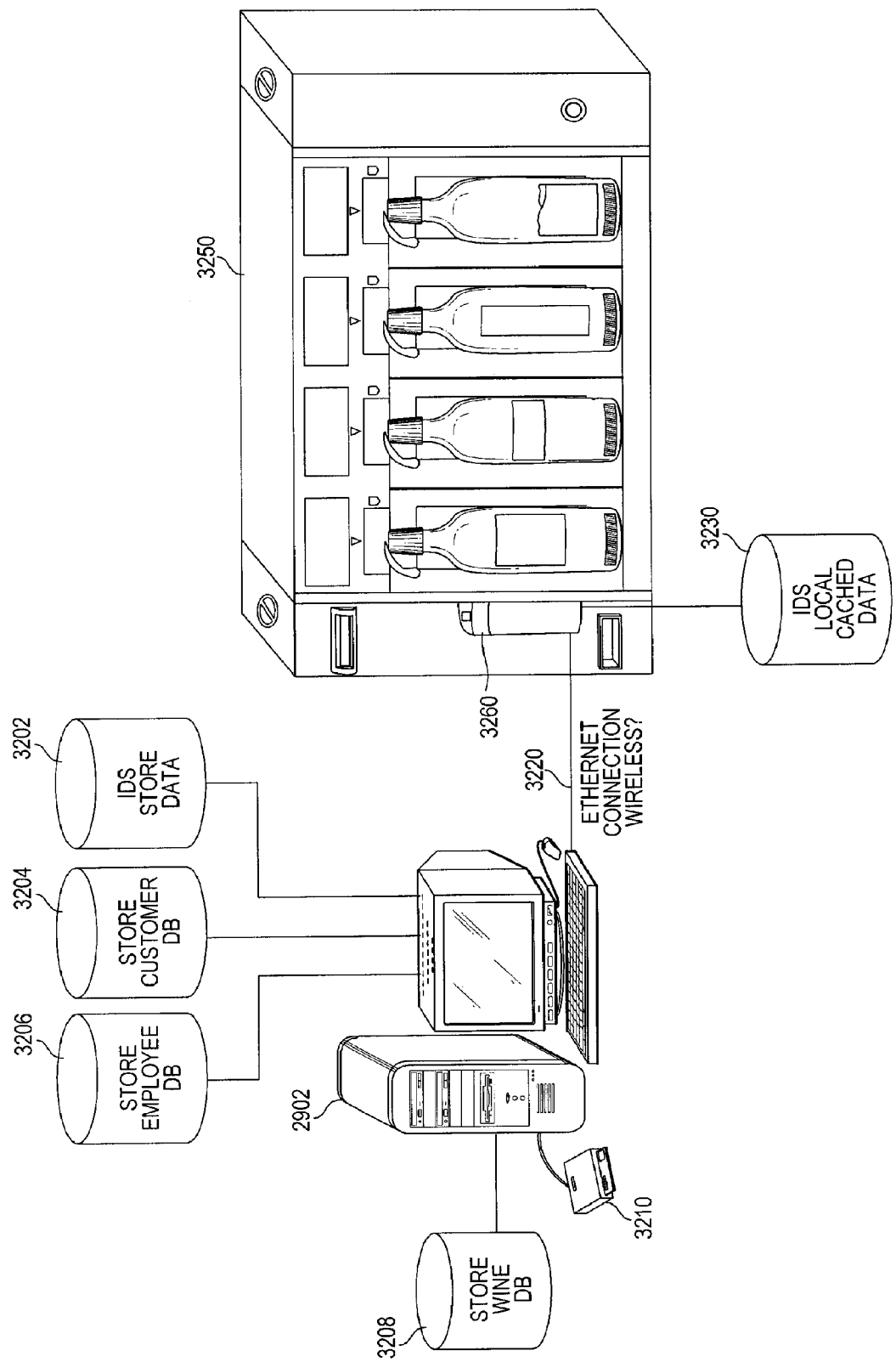
FIG. 16 is a plan view of a data access and management system.

With respect to FIG. 16, the master unit 3250 illustrated includes a controller 3260 having a memory 3230 of local cached data. This controller 3260 is liked by a connection 3220, such as an Ethernet connection, wireless connection, or other connection means to a computer 2902. The computer may have entry gated through a smartcard reader 3210. The computer may include a store wine database 3208, a store employee database 3206, a store customer database 3204, IDS store data 3202, etc. Information from the computer databases may be sent to local cached data memory 3230, and data from located cached data memory 3230 could be sent to the databases through computer 2902.

With reference to FIG. 17, the steps of wine pouring are shown. First, box 1710, a smartcard is purchased and initialized. During this process, the customer data is collected, 1712. At step 1714, the collected customer data is stored in store and IDS databases. The customer, with an authorized card, inserts the card in a master unit in step 1720. The master unit will identify and validate the card in step 1722. The controller would then enable the appropriate pour buttons 1724. A user would then select pour type at step 1726. The wine is dispensed at step 1730 (including clearing the spout with a puff of gas). The data on the pour is collected at step 1732. Optionally, user feedback may be gathered through enabling feedback buttons at step 1734. Feedback data is then collected at step 1736. The controller then determines if the bottle is empty 1740. If yes, the pour buttons are disabled and an alert is issued at step 1742. If not, the system queries if the user still has credit on the user's card. If yes, the option for another pour at step 1746 allows looping back to step A at 1752 and a repeat of the cycle. If no credit is on the card, the button are disabled at step 1750. If no additional pour is selected, in step 1748, the card may be removed. If it is removed, the buttons are disabled at step 1750. If not, the system can again query if another pour is requested at step 1746.

For purposes of discussing and understanding the invention, it is to be understood that various terms are used by those of skill in the art to describe techniques and approaches. Furthermore, in the description, for purposes of explanation, numerous specific details are set forth in order to provide a thorough understanding of the present invention. It will be evident, however, to one of skill in the art that the present invention may be practiced without these specific details. In some instances, well-known structures and devices are shown in block diagram form, rather than in detail, in order to avoid obscuring the present invention. These embodiments are described in sufficient detail to enable those of skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory, and/or logic circuitry. These algorithmic descriptions and representations are the means used by those of skill in the arts to most effectively convey the substance of their work to others of skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Further, any of the methods according to the present invention can be implemented in hard-wired circuitry, by programmable logic, or by any combination of hardware and software.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROMs), electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; and other memory devices.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive.

Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Thus, a method and apparatus for a liquid dispensing head and system have been described. This gas system as indicated in FIG. 1 may include tanks self-contained within the master and expansion units or may include outside gas sources.

Figure 18:
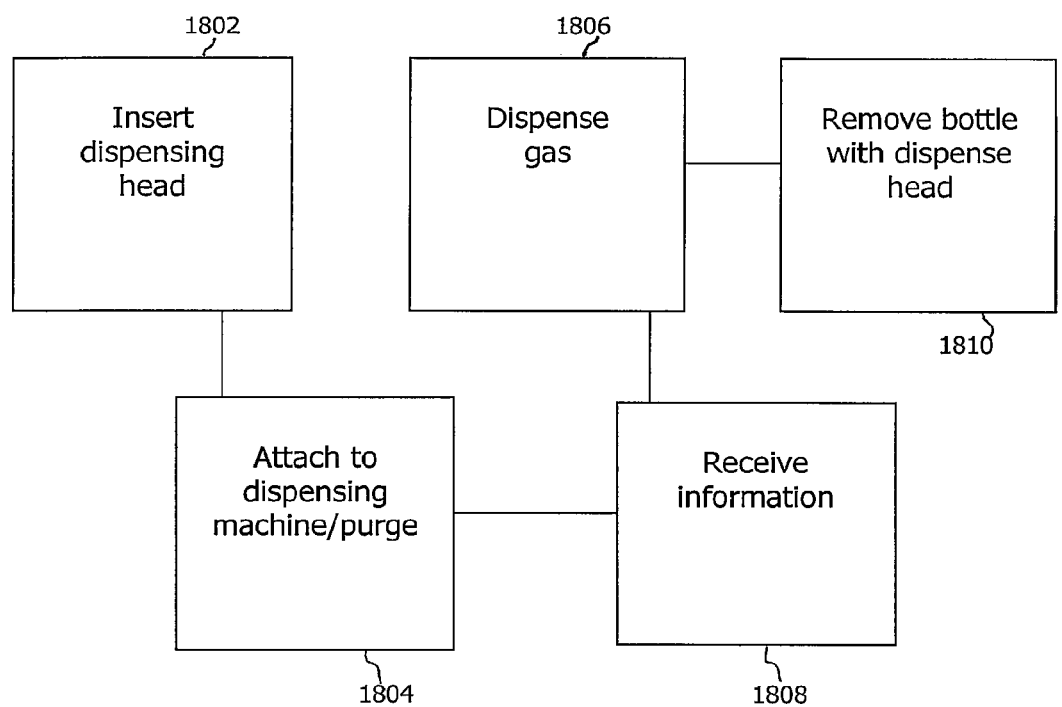
FIG. 18 is a flow chart of the method of using the dispense head.

With reference to FIG. 18, the already described use of the dispense head is shown in a flow chart form. The step of inserting the dispense head, in the bottle, as discussed previously with respect to FIG. 3 is shown in as initial step 1802. The bottle with attached dispense head is then inserted in the dispense machines as described previously with respect to FIG. 9 at step 1804. An initial puff of gas could be used to purge the air from within a bottle at the docking step. The machine then receives information at step 1808, such as by the actuation of a pour button discussed above. The system would then use a flow of inert gas to dispense liquid from within the bottle 1806. At step 1810, the bottle, sealed by the dispense head, could be removed from the dispensing machine.

What is claimed is:

1. A method comprising:
   placing a dispensing head into a neck of a bottle, said dispensing head having a pour spout a rotating valve and a gas intake;
   moving said bottle with inserted dispensing head into contact with a dispensing machine, such that the intake on said dispensing head is in fluid communication with a gas line on said dispensing machine;
   receiving, at said dispensing machine, information relating to an amount of liquid to be dispensed; and
   injecting from the dispensing machine into the bottle an amount of an inert gas sufficient to displace the amount of liquid to be dispensed through the pour spout, by rotating the rotating valve such that said gas intake has a gas pathway into the bottle and inert gas.

2. The method of claim 1, further including electrically sensing when said dispensing head is in contact with said dispensing machine and injecting into the bottle an amount of inert gas only when electrically sensing said dispense head is in contact with said dispensing machine.

3. The method of claim 1, further including a final step of clearing liquid from said pour spout with a puff of said inert gas.

4. The method of claim 1, further including a step after moving the bottle into contact with a dispensing machine but before injecting into the bottle an inert gas a step of purging air from said bottle, wherein said dispensing head prevents back flow of air into said bottle and replacing purged air in said bottle with an inert gas.

5. The method of claim 4, wherein said purging step requires rotating the rotary valve on said dispensing head.

6. The method of claim 1, further comprising a final step of removing the bottle from the dispensing machine, wherein said dispensing head is retained on the bottle and prevents air from entering the bottle.

7. The method of claim 1, wherein moving said bottle into contact with a dispensing machine includes placing said bottle in a temperature controlled stall in said dispensing machine.

8. The method of claim 1, wherein receiving at said dispensing machine, information relating to an amount of liquid to be dispensed includes having a user select a pour volume at a displayed price.

9. The method of claim 1, wherein prior to receiving at said dispensing machine, information relating to an amount of liquid to be dispense, a step of receiving at said dispensing machine a payment amount.

\* \* \* \* \*